INVENTOR
GEORGE W. HEARD
BY Kenneth B. Hamlin
ATTORNEY

United States Patent Office 3,606,196

Patented Sept. 20, 1971

3,606,196

WHORL CONTROL SYSTEM

George Waller Heard, Cheshire, Conn., assignor to Allied Control Company, Incorporated, Plantsville, Conn.

Filed June 1, 1970, Ser. No. 41,987
Int. Cl. B65h 57/00, 59/16
U.S. Cl. 242—155M 12 Claims

ABSTRACT OF THE DISCLOSURE

Circuits are disclosed to control the power supply furnishing D.C. voltage to a plurality of electromagnetic whorl tension devices which control the tension of a plurality of yarns during the production of a beam by a warper. Five voltage level controls, five adjustable timing controls and two ramp voltage controls are disclosed to enable the application of the tension to the plurality of yarns to be within close tolerances of a selected running tension level during the starting, running and stopping of the beaming operation.

FIELD OF THE INVENTION

The present invention relates to magnetic hysteresis yarn tension devices utilized to control the tension of traveling yarns in the textile industry, and more particularly to circuits for simultaneously controlling large numbers of such devices to perform a textile operation.

BACKGROUND OF THE INVENTION

Tension devices are used extensively in the textile industry to maintain traveling yarns under controlled tension. For example, in the beaming of a warp, hundreds of yarn packages or spools are mounted in a creel and the yarns are simultaneously drawn to the spool of a warper (beaming machine). Unless the tension of all the yarns is substantially uniform, a defective warp can result. Accordingly, an individual tension device is utilized to control the tension of each individual yarn involved in the beaming operation.

One type of tension device called an electromagnetic whorl or magnetic torque yarn tension device has been found to be particularly advantageous by the textile industry because hundreds of devices may be simultaneously controlled by common controls to select the desired tension for a large number of traveling yarns. Such devices are described, for example, in U.S. Pat. Nos. 2,705,362 and 2,738,937 which issued to R. H. Roughsedge on Apr. 5, 1955 and Mar. 20, 1956, respectively, and U.S. Pat. No. 3,034,744 which issued to J. E. Bancroft on May 15, 1962. In such devices, one or more turns of a single yarn are trained about the periphery of a rotatable capstan in such manner as to rotate the capstan in response to the travel of the yarn. The capstan is operatively connected to a rotatable armature or rotor which is axially positioned in the magnetic field of a field member. When the field member is energized, a magnetic couple is produced between the rotating armature and the field member. This magnetic couple tends to oppose the rotation of the armature and results in a tension being applied to the traveling yarn. By varying the strength of the magnetic field produced by the field member the tension applied to the yarn may be varied.

Control systems heretofore used to control the operation of a large number of electromagnetic whorls of the type indicated above to perform a textile operation, such as the beaming of a warp, provide three basic voltage levels to control the devices. The R. H. Roughsedge Pat. 2,705,362 cited above describes a control system which supplies an adjustable run voltage to such devices to provide a selected run tension level for a plurality of yarns. This patent also discloses a means for increasing the run voltage level to a higher stop voltage to provide a higher tension to overcome the inertia of the tension devices when the textile operation is halted. Although not described in this Roughsedge patent, some known control systems utilize a third voltage level between the run and stop voltage levels to provide a residual tension on the yarn while the textile operation is halted. This hold voltage level is utilized to prevent the overrun of the whorl capstan by the yarn during a start sequence. In these control systems, this hold voltage level is reduced to the run voltage level when the velocity of the yarn has developed to a sufficient speed to remove any slack which would result from a sudden downshift to the run voltage level and lower run level tension.

One of the many problems encountered with the simple control systems now utilized is that the impression of the higher stop voltage level on the whorls when a stop signal is received causes a tension peak on the yarns due to the whorls attempting to stop faster than the winding apparatus or beaming machine. Still another problem that is encountered with the presently known control systems results from the application of the higher hold voltage level to the whorls to prevent yarn overrun of the whorl capstans prior to reducing the voltage to the run level. Prior to the reduction in voltage to the run level, all of the yarn wound at the higher voltage level is subjected to higher tension as well as erratic peaks and valleys of tension caused when the warper movement starts. This is detrimental to the physical and dyeing properties of the yarn and in many cases may cause misthreading of the yarn around various machine parts.

To alleviate some of the above-mentioned difficulties it has been necessary in known control systems to take considerably longer intervals in each start up process in order to minimize the tension fluctuations that are encountered. It has also been necessary to keep the speed of the winding or beaming operation at a reduced level because of the fluctuations in tensions that are encountered in the start up and stopping operations. Thus the beaming machines cannot operate at maximum capability.

SUMMARY OF THE INVENTION

It is an object of the present invention to eliminate the above-described difficulties experienced with the presently known whorl control systems.

It is another object of the present invention to reduce the cost of textile operations by providing the ability to successfully process yarns with controlled tensions within close tolerances at substantially higher speeds than are currently attainable.

It is also an object of the present invention to reduce the cost of maintaining and operating tension control systems and to provide repeatability in the adjustment of the system for selected yarn tensions and yarn sizes.

The foregoing and other objects are obtained in an illustrative embodiment of a whorl control system in accordance with the present invention wherein special circuits control voltage level shifts, provide delays in the application of various voltage levels, and provide voltage ramps to the whorls to cause the application of tension to individual yarns to be within close tolerance of the selected running tension level during start up of the textile operation and during the interval between the receipt of a stop command or signal and the actual halting of the textile operation.

It is a feature of the whorl control system of the present invention to delay the application of the high level stop voltage to the whorls for a predetermined interval after a stop command is received. This interval is selected to correspond to the warper brake reaction time to control stopping tension on the yarns. The application of the high level stop voltage is not applied to the yarns until the warper actually starts to decelerate at a rapid rate. The high peak tension levels experienced in the prior art control systems are eliminated.

It is also a feature of the control system of the present invention to apply a start level voltage to the whorls just prior to warper movement in a start up operation. This start voltage which may be lower or higher than the run level voltage is selected to substantially reduce the drag that the whorls apply to the yarns when the warper movement is initiated. As soon as warper movement is initiated the control system of the present invention immediately switches the voltage to a higher value to prevent overrun of the yarn on the whorl capstan. The start voltage allows low yarn momentum to induce whorl movement and prevent the high peak tension oscillations experienced with the presently known control systems.

It is also a feature of the invention that the high level voltage applied to the whorls, when warper movement is initiated, decay in declining ramps at predetermined adjustable rates as the warper acceleration increases such that a selected run tension will be applied to the yarns prior to the warper reaching the final run speed. The rate of decay is determined by the interaction of the particular yarns elastic modulus with the whorls inertial forces.

It is a further feature of the invention to monitor the voltage applied to the whorls and to halt the beaming operation if the voltage falls below a predetermined value.

DESCRIPTION OF THE DRAWINGS

The foregoing and other objects and features of the invention will be more readily understood from a reading of the following description of an illustrative embodiment of the invention taken in conjunction with the accompanying drawing in which.

GENERAL DESCRIPTION

Figure 1:
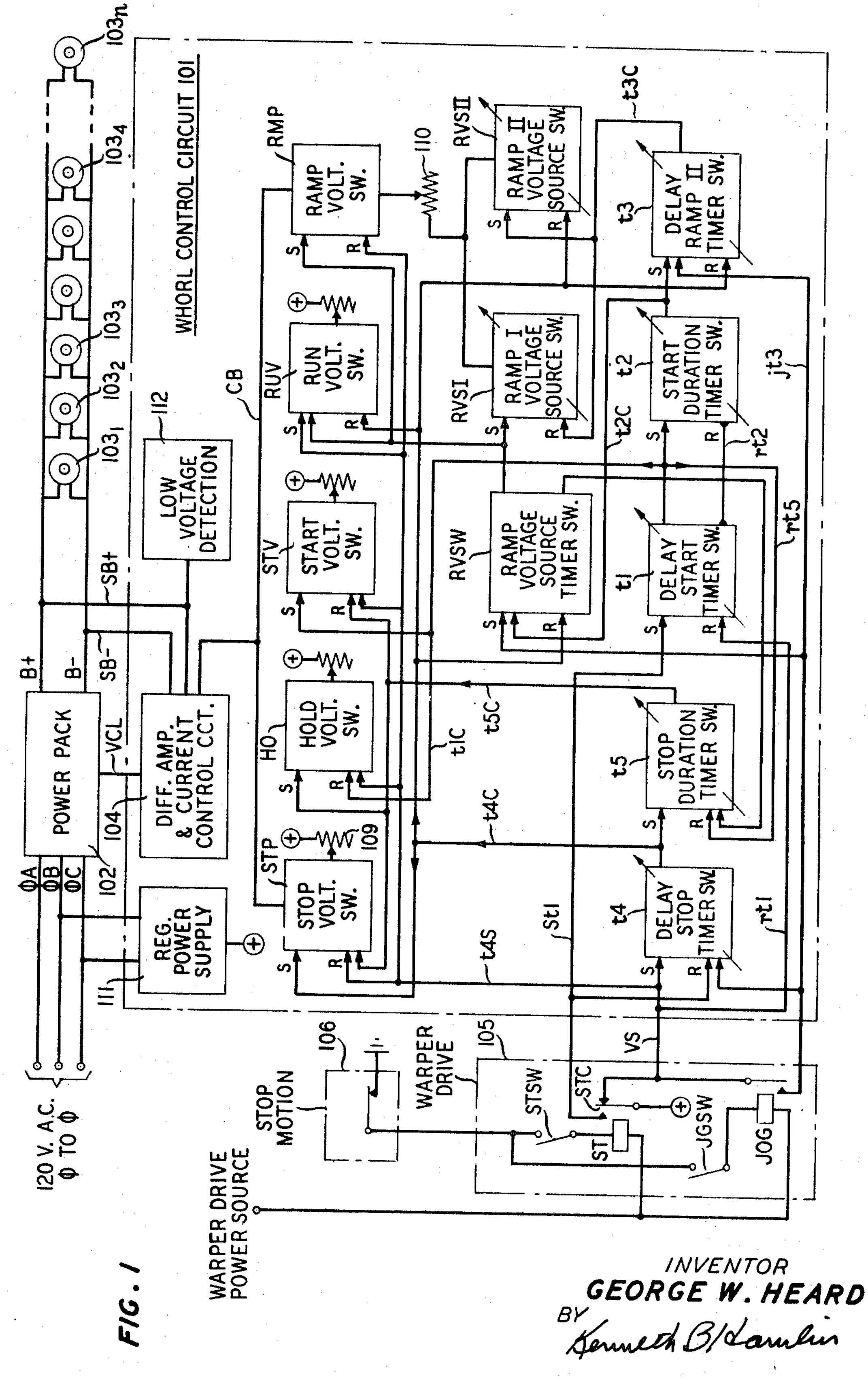
FIG. 1 is a functional block diagram schematic of a whorl control system illustrating the principles of the present invention.

Referring now to the drawing, FIG. 1 is a functional block diagram schematic illustrating the principles of the present invention. Whorl control circuit 101 is shown controlling a power pack 102 which provides a D.C. voltage via buses B+ and B− to a plurality of electromagnetic whorls designated $\mathbf{103}_1$, $\mathbf{103}_2$ . . . through $\mathbf{103}_n$. These whorls are advantageously of the type described in the above-identified Roughsedge and Bancroft patents. Power pack 102 may advantageously be a three-phase full wave silicon controlled rectifier bridge that provides a regulated D.C. output voltage to the B+ and B− buses to the whorls. The input to power pack 102 as shown in FIG. 1 is supplied from a three-phase A.C. source, 120 volts phase-to-phase.

Whorl control circuit 101 contains five voltage controls, five adjustable timing controls, and two adjustable ramp voltage controls which are operated in a definite sequence for control of the starting, running and stopping of the whorl tension devices 103 when actuated by the warper drive. Whorl control circuit 101 controls power pack 102 via leads VCL which extend from a differential amplifier and current control circuit 104. The warper which is employed for beaming yarn is shown diagrammatically as warper drive 105 in FIG. 1. In the beaming operation, ends of yarn are drawn from a plurality of yarn packages or spools and passed around individual yarn tension devices 103 onto the spool of the warper. When the warper is not energized and the beaming operation is halted, the ST relay shown in warper drive 105 is released and a positive potential is supplied through the back contact STC of relay ST to the VS lead. When the beaming operation is started, the ST relay will be operated from a potential supplied by the warper drive power source and a positive potential will be supplied through the front contact of ST relay to the *St1* lead. The ST relay is operated when the STSW switch on the warper drive 105 is actuated. This switch is actuated when it is desired to initiate the beaming operation.

Also shown within warper drive 105 is a relay designated JOG. This relay is operated from a potential supplied by the warper drive power source when jog switch JGSW is operated and the warper is placed in a jog condition. As is understood in the art, jogging of a beaming machine, that is, operating at a speed less than the run speed is utilized prior to a run operation to make certain that the warper and tension controls are operating properly.

Stop motion device 106 shown in FIG. 1, will, when actuated in a manner known in the art, remove the ground from the input lead of warper drive 105 which will cause either the jog relay JOG or the start relay ST, whichever is operated, to release. When this occurs the beaming operation is halted.

Figure 2:
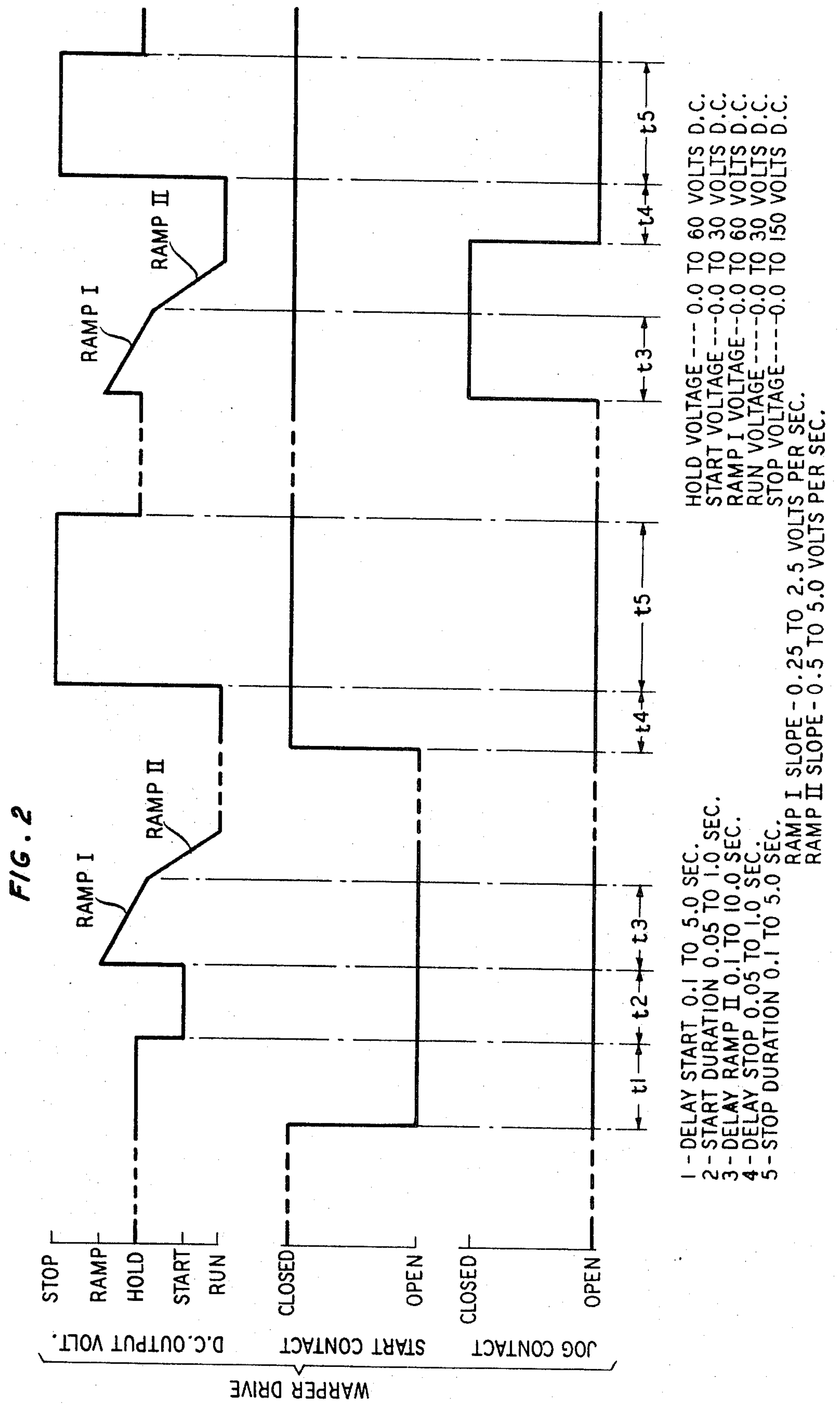
FIG. 2 is a graphical representation of the voltage levels and timing intervals provided by the whorl control circuits of the present invention to control a plurality of whorls during a beaming operation.

The five adjustable timing intervals are illustrated graphically in FIG. 2 along with the five output voltage levels from power pack 102 utilized to control the whorls 103 during the starting, running and stopping sequences of the beaming operation. The timing intervals shown in FIG. 2 are provided by adjustable timer switches designated *t1*, *t2*, *t3*, *t4*, and *t5* in FIG. 1 which provide the *t1* delay start timing interval, *t2* start duration timing interval, *t3* delay ramp II timing interval, *t4* delay stop timing interval and *t5* stop duration timing interval. The adjustable timer switches *t1* through *t5* when energized by the application of a voltage to their set input will commence timing a predetermined time interval. When the predetermined time has elapsed the switch operates and a signal is applied to its output terminal.

Power pack 102 is controlled to provide five voltage levels to the B+ and B− buses by the operation of five switches in whorl control circuit 101. These five switches designate stop voltage switch STP, hold voltage switch HO, start voltage switch STV, run voltage switch RUV, and ramp voltage switch RMP are shown in block form and are actuated when a voltage is applied to the set input lead. When this occurs the switch is operated and a voltage is supplied from the switch to the common bus CB which extends to the lower input of differential amplifier and current control circuit 104.

Circuit 104 controls power pack 102 via leads VCL to provide the selected level of voltage to the B+ and B− buses extending to whorls 103. The voltage level supplied by power pack 102 to the B+ and B− buses is also applied via leads SB+ and SB− to the differential amplifier and current control circuit 104 and compared with the voltage level applied to the common bus CB by the five voltage control switches in whorl control circuit 101. When an unbalance occurs control circuit 104 will vary the firing angle of the silicon controlled rectifiers in power pack 102 via leads VCL to change the D.C. output voltage applied to the B+ and B− buses to the deserved value.

Voltage is supplied to four of the voltage switches from the regulated power supply 111 through potentiometers, such as potentiometer 109 shown associated with stop voltage switch STP. The circled + sign indicates a positive voltage source from power supply 111. In this manner the level of voltage applied through the switches may be preselected and hence the whorls may be adjusted for different sizes and types of yarns having different tension requirements. The fifth voltage switch RMP is supplied by a voltage from the ramp I voltage source switch RVSI or the ramp II voltage source switch RVSII via potentiometer 110. These two voltage source switches in cooperation with the ramp voltage source timer switch RVSW provide the decaying ramp voltages, ramp I and ramp II, shown in graphical form in FIG. 2.

The operation of whorl circuit 101 of FIG. 1 will now be described with reference to FIG. 2 for the starting, running and stopping sequences of a beaming operation. Assume that power has just been turned ON and the warper drive 105 is not energized and hence the beaming operation has not been initiated. When this occurs, positive potential is supplied through the back contact STC of the start relay ST in warper drive 105 to the VS lead. This positive potential is applied to the set input of the delay stop timer switch *t4* and will initiate the delay stop timing interval *t4* shown in FIG. 2. The application of the voltage via the VS lead to the set input of the delay stop timer switch *t4* is also applied to the *t4s* lead which extends to a reset input of the stop voltage switch STP resetting this switch, to a reset input of a hold voltage switch HO resetting this switch, to a reset input of a start voltage switch STV resetting this switch, to a set input of the run voltage switch RUV setting this switch, and to a reset input of the ramp voltage switch RMP resetting this switch. Thus, when the *t4* delay stop timer switch starts to time, all of the voltage switches are reset to normal except the run voltage switch RUV which causes a momentary application of the run voltage to the common bus CB and correspondingly to the B+ and B− buses extending to the whorls 103. The purpose of this will be described hereinafter.

When delay stop timer switch *t4* times out a positive signal will be applied from its output via the *t4c* lead which extends to the set input of stop voltage switch STP setting this switch and causing the application of a stop voltage to the common bus CB. Similarly, the voltage on *t4c* lead is applied to reset the ramp voltage source timer switch RVSW, the run voltage switch RUV, the ramp II voltage source switch RVSII, and the delay ramp II timer switch *t3*, resetting these switches. The voltage from the output of the delay stop timer switch is also applied to the set input of the stop duration timer switch *t5* to initiate the timing of the delay stop timing interval *t5* shown in FIG. 2.

When stop duration timer switch *t5* times out, a positive signal is applied via the *t5c* lead to reset the stop voltage switch STP, to set the hold voltage switch HO, and to reset the start voltage switch STV. When this occurs the stop voltage is removed and the hold voltage is applied as indicated in FIG. 2. The warper is not operating and a residual hold tension is being applied to the yarns by the whorls. This continues until a beaming operation is initiated and the start relay ST, in warper drive 105 is operated.

Assume now that the warper drive 105 is actuated and the start relay ST is operated which will operate the contacts of the start relay ST and apply a positive voltage to the S*t1* lead which extends to the set input of the delay start timer switch *t1*. The voltage on the S*t1* lead is also applied to a reset input of the delay stop timer switch *t4* to reset this switch in preparation for a subsequent stop sequence. The *t1* delay start timing interval is shown in FIG. 2 and results in the hold voltage being applied to whorls 103 after a start signal is applied until the warper actually begins movement. The delay start interval as indicated in FIG. 2 may be varied from 0.1 second to 5.0 seconds and is adjusted for the particular warper machine being utilized.

When delay start timer switch *t1* times out at the end of the *t1* interval shown in FIG. 2, start voltage is applied to the whorls 103. A positive voltage signal is applied to the upper output lead of delay start timer switch *t1* when it times out. This is extended via lead *t1c* to a reset input of the hold voltage switch HO which resets and removes the hold voltage from common bus CB, to the set input of start voltage switch STV operating this switch to apply start voltage to the common bus CB and thus to the whorls as described above. A positive signal at the output of delay start timer switch *t1* is also applied via lead *rt5* to a reset input of the stop duration timer *t5* resetting this switch in preparation for a subsequent stop duration timing. A positive output signal from the delay start timer switch *t1* is also applied to the set input of the start duration timer switch *t2*. This initiates the timing of the duration that the start voltage is applied to the whorls 103.

As indicated in FIG. 2, the start duration timing interval *t2* may be varied from .05 to 1.0 second. The start voltage is utilized so that the whorls starting inertia is minimized. This will allow the yarn momentum to induce whorl movement. When start duration timer switch *t2* times out a positive voltage signal is applied via lead *t2c* to a set input of ramp voltage source timer switch RVSW. This timer switch is not adjustable and as will be described hereinafter in the detail description, provides time interval for a capacitor to charge to provide the voltage source for the ramp I voltage and ramp II voltage switches to be applied to the common bus CB. When start duration timer switch *t2* times out the positive voltage at its output is also applied to the delay ramp II timer switch *t3*. This initiates the timing of the delay between the application of the ramp I voltage and the ramp II voltage as shown in FIG. 2.

When ramp voltage source timer switch RVSW times out a positive signal is applied to the set input of ramp I voltage source switch RVSI, to the set input of the run voltage switch RUV and to the set input of the ramp voltage switch RMP. Immediately upon this occurring the voltage applied to the whorls is increased to the top of ramp I as shown in FIG. 2. The voltage begins to decline at a slope which may be varied from 0.25 to 2.5 volts per second as indicated in FIG. 2. The run voltage is turned on at this point in time to provide a voltage level to which the ramp voltages decline. The initial high ramp voltage or peak ramp as shown in FIG. 2 is selected by the adjustment of potentiometer 110 which takes the voltage supplied by ramp voltage source switch RVSI and applies it through ramp voltage switch RMP to the common bus CB. This high ramp voltage is applied to prevent detrimental whorl overrun by the yarns during a start up procedure.

When delay ramp II timer switch *t3* times out as shown in FIG. 2, the ramp II voltage is applied through ramp voltage switch RMP to common bus CB. This is accomplished by the positive signal from the output of delay ramp II timer switch *t3* via lead *t3c* setting the ramp II voltage source switch RVSII and resetting the ramp I voltage source switch RVSI. When the ramp II voltage declines down to the run voltage level the warper is running at its selected run speed and the beaming operation will continue until the halt is signaled.

When the warper drive 105 is halted by the release of the ST relay or when a stop motion device 106 is operated in response to some malfunction, the delay stop timer sequence described hereinbefore is initiated. The voltage applied through the back contact STC of the ST relay to the VS lead will set delay stop timer switch *t4* to initiate the delay stop timing interval *t4*. This voltage is also applied via lead *rt1* to a reset input of a delay start timer switch *t1* resetting this switch. When relay start timer switch *t1* resets it applies a signal via lead *rt2* from its lower reset output to the reset input of the start duration timer switch *t2* resetting this switch in preparation for a subsequent start sequence. The sequence described hereinbefore is again initiated and the delay stop timer switch *t4* when it times out applies a signal over the *t4c* lead and to the stop duration timer switch *t5*.

As indicated in FIG. 2, the delay stop interval *t4* may be varied from .05 to 1.0 second and is adjusted to correspond to the brake reaction time of the particular warper used in the beaming operation. Also as indicated in FIG. 2 the stop duration interval *t5* may be varied from .1 to 5.0 seconds. This interval is not critical so long as it is set to allow the stop voltage to be applied to the whorls until the warper has stopped completely. The ranges of the voltage levels supplied by power pack 102 to whorls 103 is also indicated in FIG. 2. These voltages are illustrated only to indicate the relative magnitudes of the various control voltages.

When the warper is operated in jog condition, the operation of a jog switch JGSW in warper drive 105 will cause the operation of jog relay JOG. This will apply a voltage through the back contact of the ST relay, through the front contact of the jog relay JOG and lead *jt3* to a reset input of the delay stop timer switch *t4* which will reset this timer switch in preparation for a subsequent stop sequence. The signal on lead *jt3* is also applied to a set input of the ramp voltage source timer switch RVSW setting this switch and to the set input of the delay ramp II timer switch *t3*. In this manner the closure of the jog contact will cause immediate application of the top of the ramp I voltage to the whorls 103. This is illustrated in FIG. 2 where the jog contact is shown in its closed condition initiating *t3* timing interval. This results in the immediate application of the ramp I voltage which then declines through the ramp II voltage to the run voltage level.

Low voltage detection circuit 112 shown within whorl control circuit 101 monitors the output voltage applied to the whorls 103 and if the voltage drops below a preselected voltage, relay circuitry is operated which will halt the entire beaming operation.

The release of the start relay ST in warper drive 105 will cause the application of a positive voltage through the STC contact to the VS lead or the opening of a jog contact while the warper is operating in a jog mode during the ramp I or ramp II intervals, will stop voltage decay and maintain the ramp voltage at this point on the whorls during the *t4* delay stop timing interval. In a similar manner, the release of the ST relay in warper drive 105 during a start duration timing *t1* will cause the run voltage to be applied to the whorls during the *t4* delay stop timer interval. After the *t4* time delay has occurred in either situation, the normal stop voltage will be applied and the normal cycle will continue.

The advantages and features of the whorl control system of the present invention will be appreciated by comparing yarn tension, whorl voltage, and warper speed of a typical beaming operation controlled by a whorl control system of the prior art with yarn tension, whorl voltage, and warper speed of the beaming operation controlled by a whorl control system of the present invention.

Figure 3A:
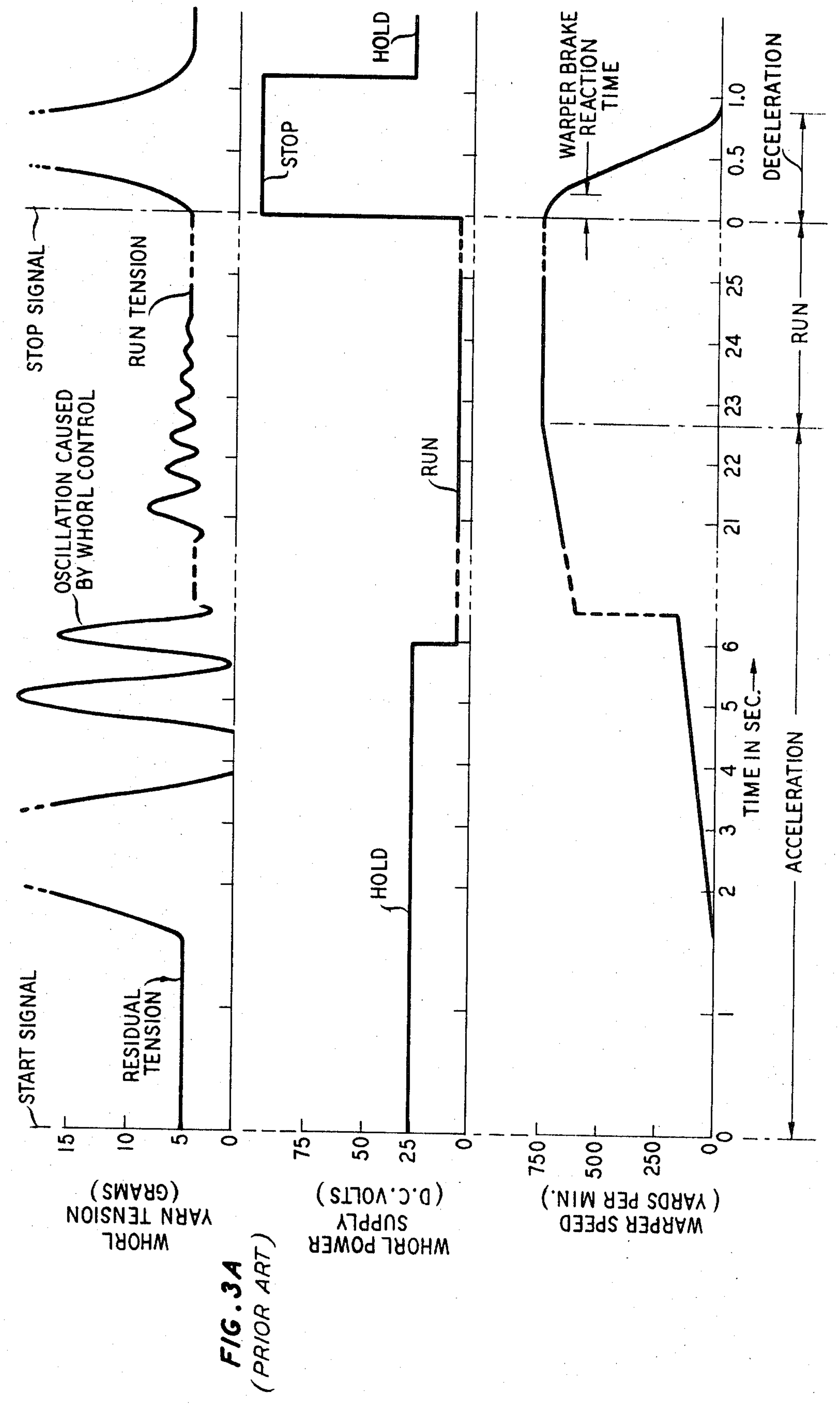
FIG. 3A is a graphical representation of yarn tension, whorl voltage and warper speed relative to time during the start up, run, and stop sequences of a typical beaming operation controlled by a whorl control system of the prior art.

FIG. 3A is a graphical representation of yarn tension, whorl voltage and warper speed plotted against time from the receipt of a start signal, through the starting sequence, the running sequence, and the stopping sequence for a typical beaming operation carried out by a whorl control system of the prior art. The three voltage levels utilized by the prior art whorl control systems that is, the hold, run and stop voltage levels are indicated in the center plot of FIG. 3A. It will be noted that the yarn tension, top plot of FIG. 3A, has violent fluctuations and oscillations as the result of the starting sequence and as a result of a stop sequence. For typical beaming operations the peaks of these fluctuations may be as high as 45 grams both at the start and the stop sequence.

Figure 3B:
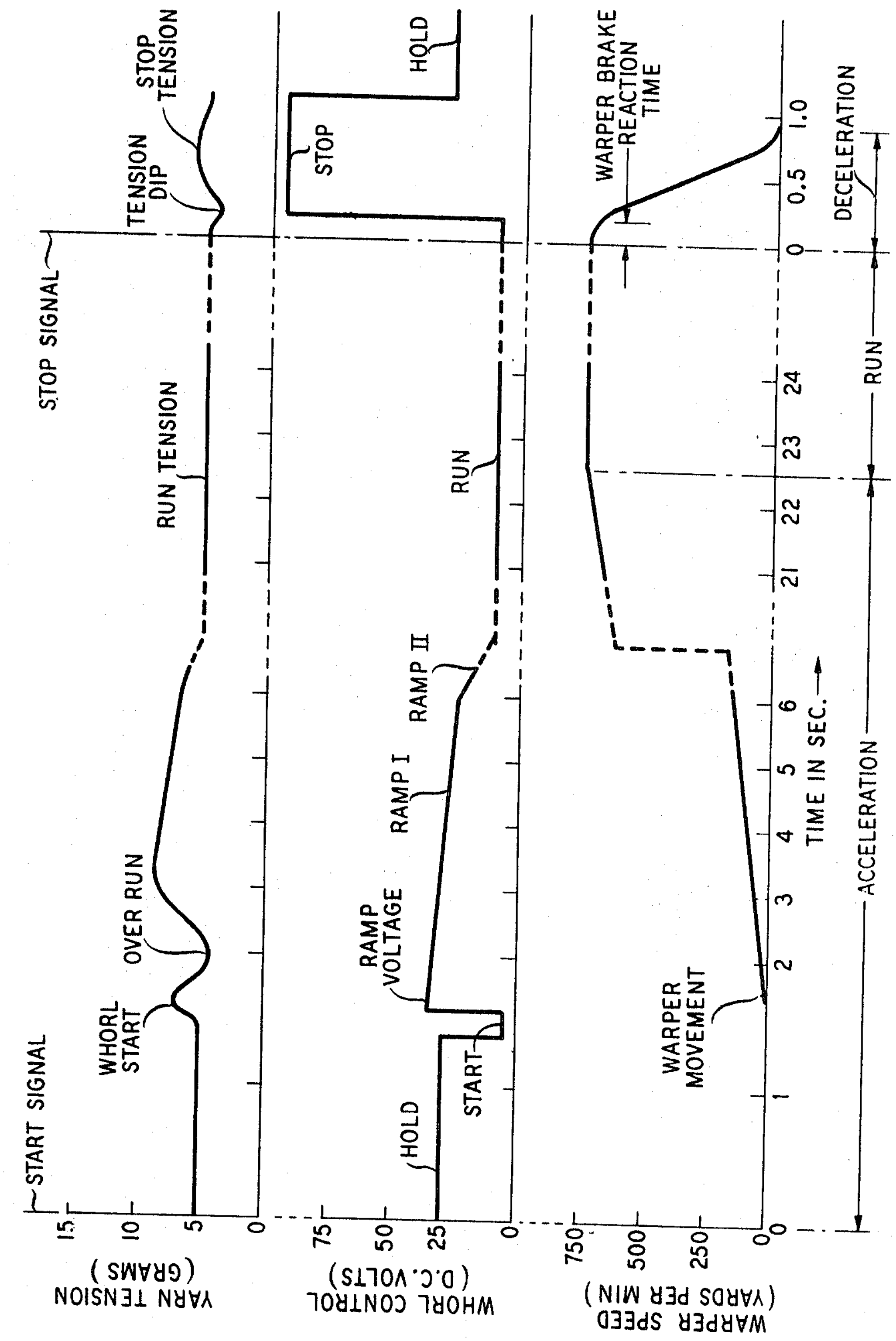
FIG. 3B is a graphical representation similar to FIG. 3A of a beaming operation controlled by the whorl control system of the present invention.

FIG. 3B is a plot of the yarn tension, whorl voltage and warper speed against time for a beaming operation controlled by a whorl control system of the present invention. The plot in FIG. 3A is to the same scale as the plot in FIG. 3B for direct comparison purposes. It will be noted in FIG. 3B, the additional voltage levels controls described hereinbefore with reference to FIG. 1 are provided by the whorl system of the present invention. These are the start voltage and the two declining ramp voltage controls. It will also be noted that the start voltage is applied to the whorls just prior to warper movement and as soon as the warper movement is initiated the voltage is increased to the peak of the ramp voltage which as shown in FIG. 3B may be higher than the hold voltage. The ramp I declining voltage as shown declines at a predetermined rate until warper acceleration has reached approximately 150 yards per minute at which time the ramp II declining voltage is applied and the voltage is rapidly decreased to the selected run voltage. It will be noted that when a stop signal is received, the application of a stop voltage to the whorls is delayed for a short interval of time which is correlated to the warper brake reaction time. A comparison of the top plots in FIG. 3A and FIG. 3B shows dramatically the advantages of the whorl control system of the present invention. The tension in FIG. 3B varies only a few grams from the desired run tension level during the starting sequence and the stopping sequence. This is contrasted with the tension oscillations and variations which occur as shown in FIG. 3A during the start sequence and stop sequence of the prior art whorl control systems.

DETAILED DESCRIPTION

Figure 4:
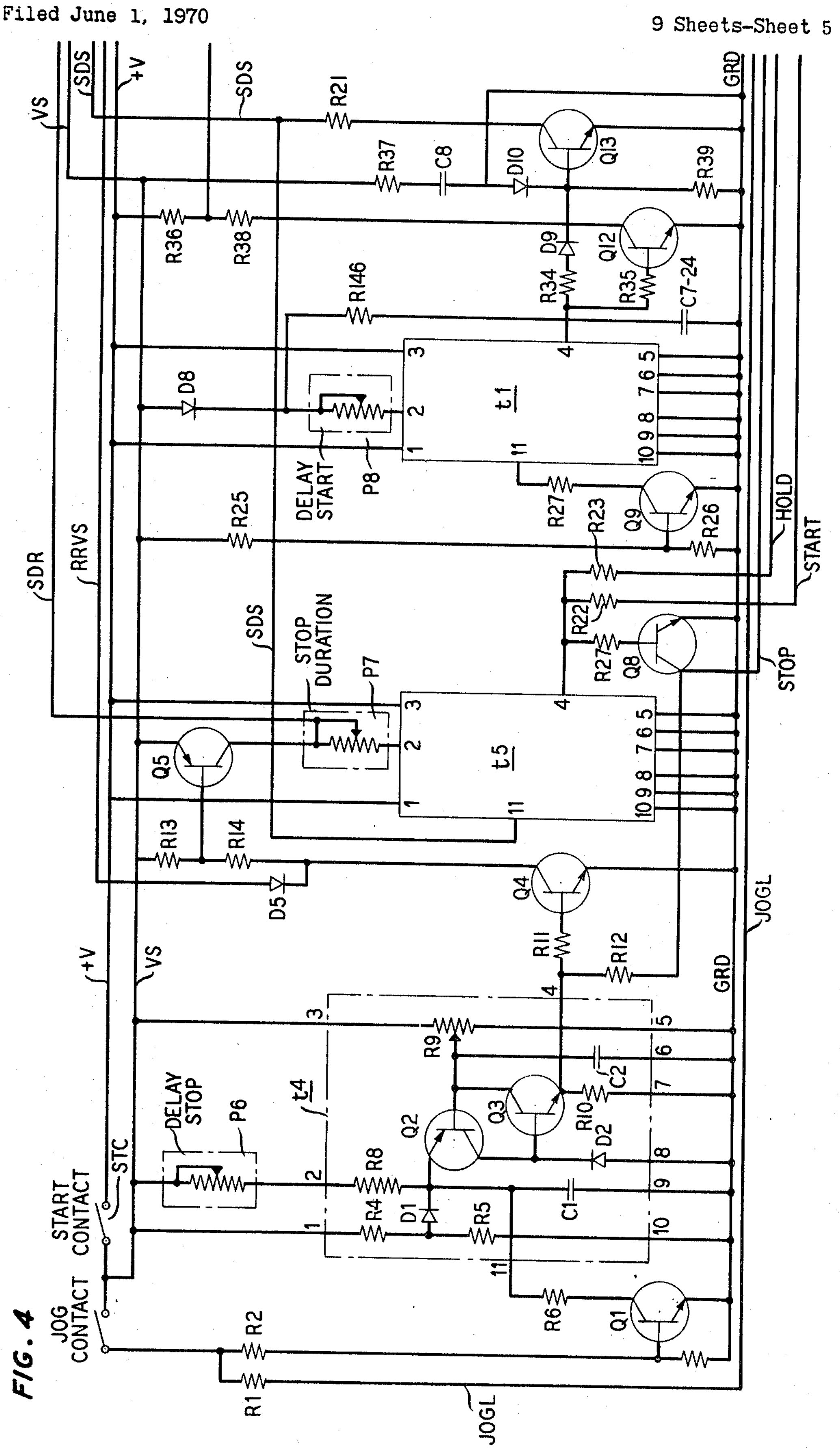
FIGS. 4 through 8 when arranged as shown in FIG. 9 provide a detailed schematic diagram of the illustrative embodiment of the whorl control system shown in the functional block diagram schematic of FIG. 1.
Figure 5:
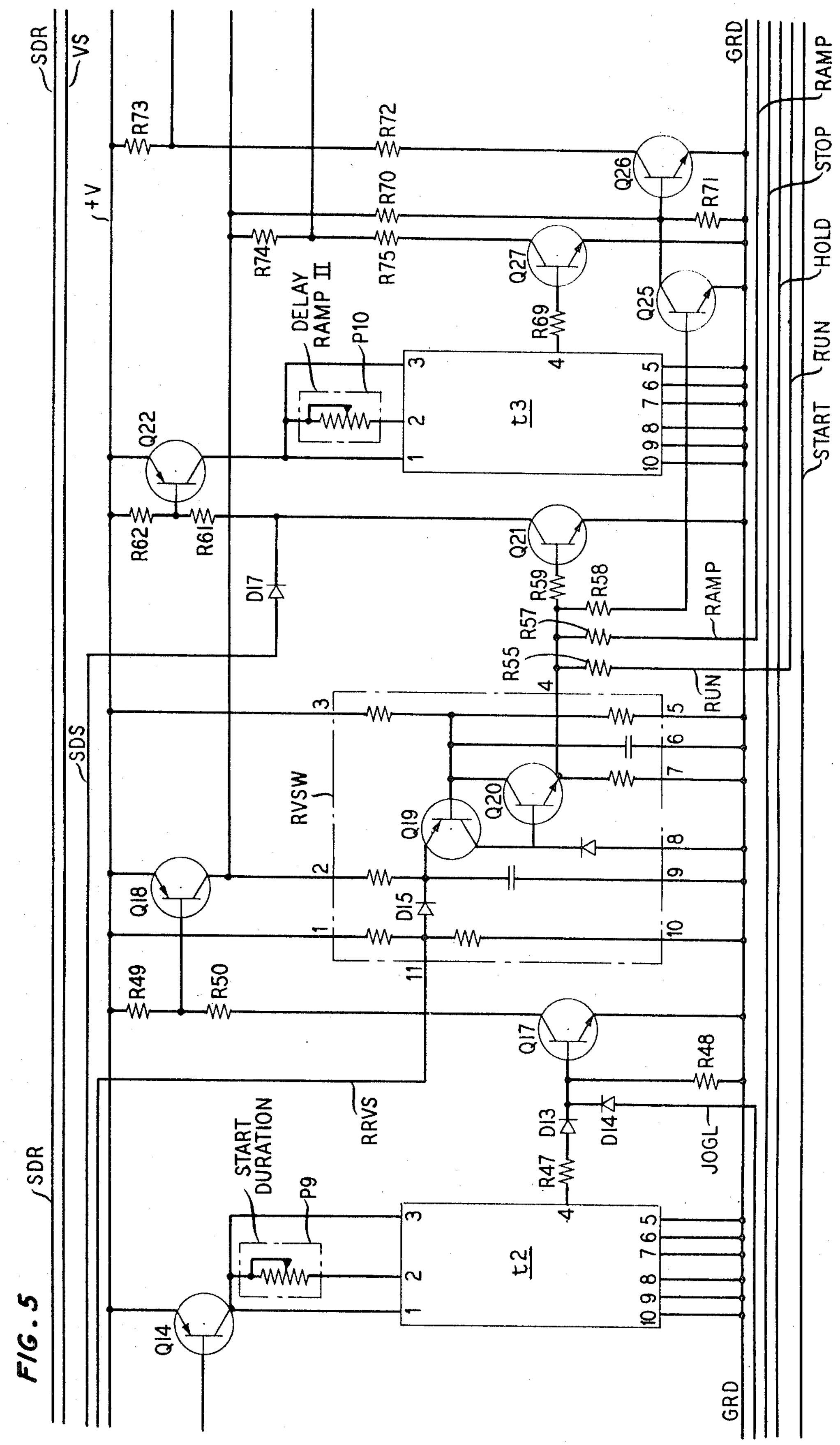
Figure 9:

A detailed schematic of an illustrative embodiment of the whorl control system of the present invention is shown in FIGS. 4 through 8 when arranged left to right as shown in FIG. 9. The delay stop timer switch *t4*, stop duration timer switch *t5* and delay start timer switch *t1* are shown in FIG. 4. The start duration timer switch *t2*, the ramp voltage source timer switch RVSW and the delay ramp II timer switch *t3* are shown in FIG. 5. All six timer switches are similar and hence only the delay stop timer switch *t4* is shown in detail. Each of the timer switches comprises a pair of transistors Q2 and Q3 with a bias network comprising resistors R4 and R5 and diode D1. Diode D2 is a temperature compensating diode and capacitor C2 is a suppression capacitor for transients which may occur on the line. Potentiometer R9 is a bias adjusting potentiometer. Capacitor C1 with resistor R8 and delay stop potentiometer P6 form the RC timing network for the delay action timing. By varying the setting of potentiometer P6 the time interval for the device to switch to its ON state after being energized may be varied.

When positive potential is applied from the +V lead through the start contact STC to the VS lead and to terminals 1, 2 and 3 of delay stop timer switch *t4*, and if transistor Q1 shown in the lower left-hand corner of FIG. 4 is nonconducting, capacitor C1 will start to charge. Its rate of charge is determined by the setting of the delay stop potentiometer P6. When the charge on capacitor C1 reaches a predetermined point, transistor Q2 will be switched ON, in turn switches ON transistor Q3 which will provide a positive voltage from the top of resistor R10 to the output terminal 4 of the device. All of the timer switches are similar and are described in detail in U.S. Pat. No. 3,282,631 of W. Mosinski granted Nov. 1, 1966 which patent is assigned to the assignee of the present invention. As will be readily understood by those skilled in the art, the illustrated PNP and NPN transistor configuration shown in the delay stop timer switch *t4* is the functional equivalent of a four terminal semiconductor device known as an NPNP transistor and sometimes referred to as a silicon control switch or more simply by the initials SCS.

Figure 6:
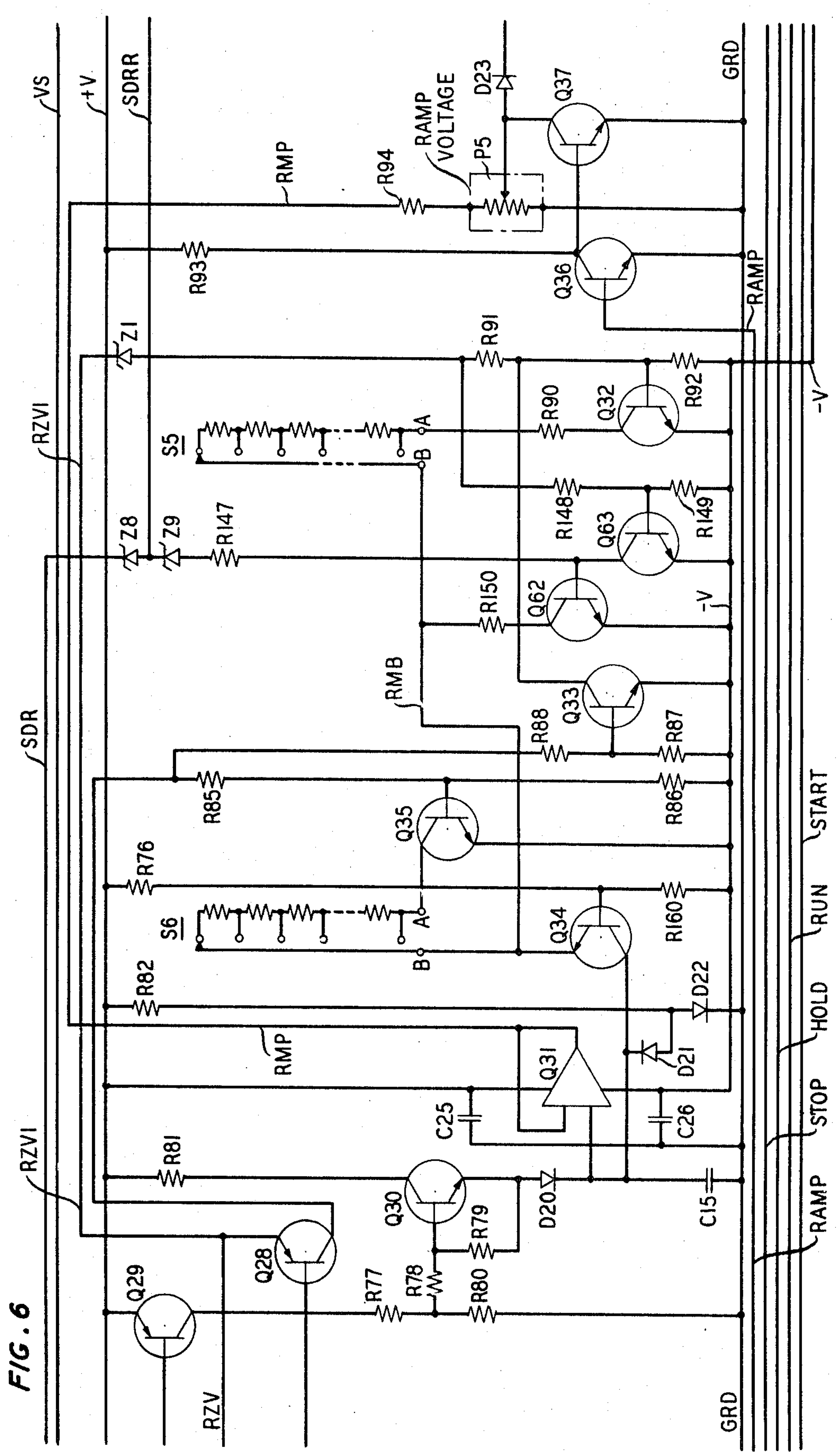

FIG. 6 is a schematic of the circuits which provide the ramp I voltage, the ramp II voltage and ramp voltage switch RMP described hereinbefore in connection with FIG. 1. Referring to FIG. 6 when transistor Q30 is switched ON, as will be described later, capacitor C15 charges from positive voltage on the +V lead through resistor R81 and diode D20 to ground. Capacitor C15 serves as a voltage source for the ramp I and ramp II voltages. As described hereinbefore, when the start duration timer switch *t*2 times out, the voltage applied to the whorls is switched from the start voltage to the top of the ramp voltage as shown in FIG. 2. At this time the charge on capacitor C15 starts bleeding off through transistor Q34, via lead RMB, through ten position variable resistor switch S5, through transistor Q32 which is turned ON to the −V lead from the regulated power supply 111. This rate of discharge is determined by the setting of the ten position switch S5 to select one of ten resistance values. The charge which does not bleed off via this path is applied through operational amplifier Q31 to the RMP lead which extends through resistor R94 to the ramp voltage potentiometer P5. This potentiometer is adjusted to determine the top of the ramp voltage. The ramp voltage is then applied through diode D23 to the common bus CB and to the input of differential amplifier Q48 shown in FIG. 8. The ramp voltage switch RMP (FIG. 1) consists of transistor Q36 and transistor Q37 shown in FIG. 6. When transistor Q37 is nonconducting the ramp voltage is applied through diode D23 to common bus CB. On the other hand if transistor Q37 is conducting, the ramp voltage is shunted to ground.

As will be described later when delay ramp II timer switch *t*3 times out, the voltage discharge from capacitor C15 through transistor Q34 is switched from the S5 switch to the S6 switch and transistor Q35 which is turned ON. A second rate of discharge when is controlled by the setting of the S6 switch in the same manner as the rate was controlled by the S5 switch. This determines the rate of decline of the ramp II voltage applied through operational amplifier Q31 to the RMP conductor and the ramp voltage potentiometer P5.

Figure 7:
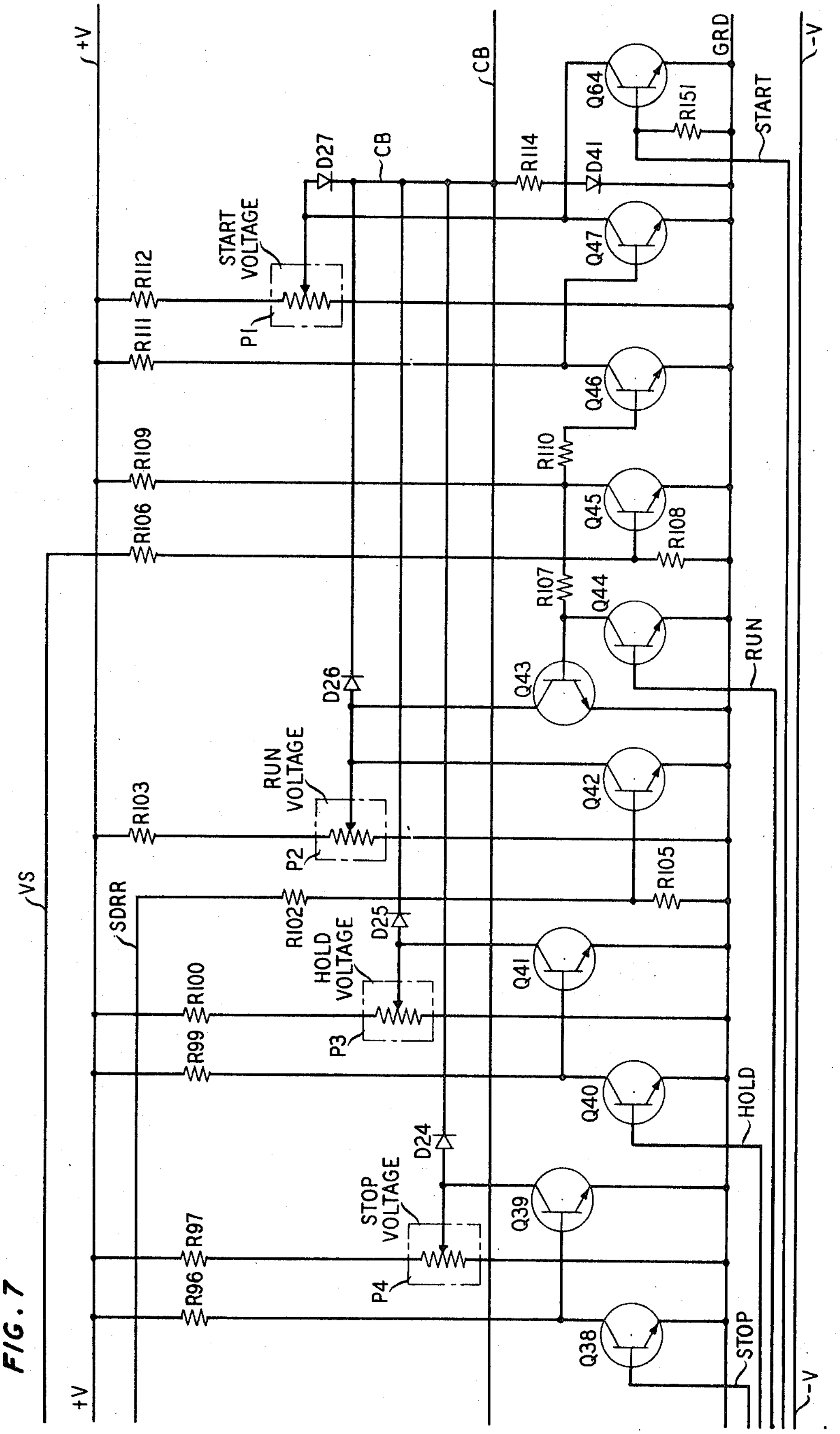
Figure 8:
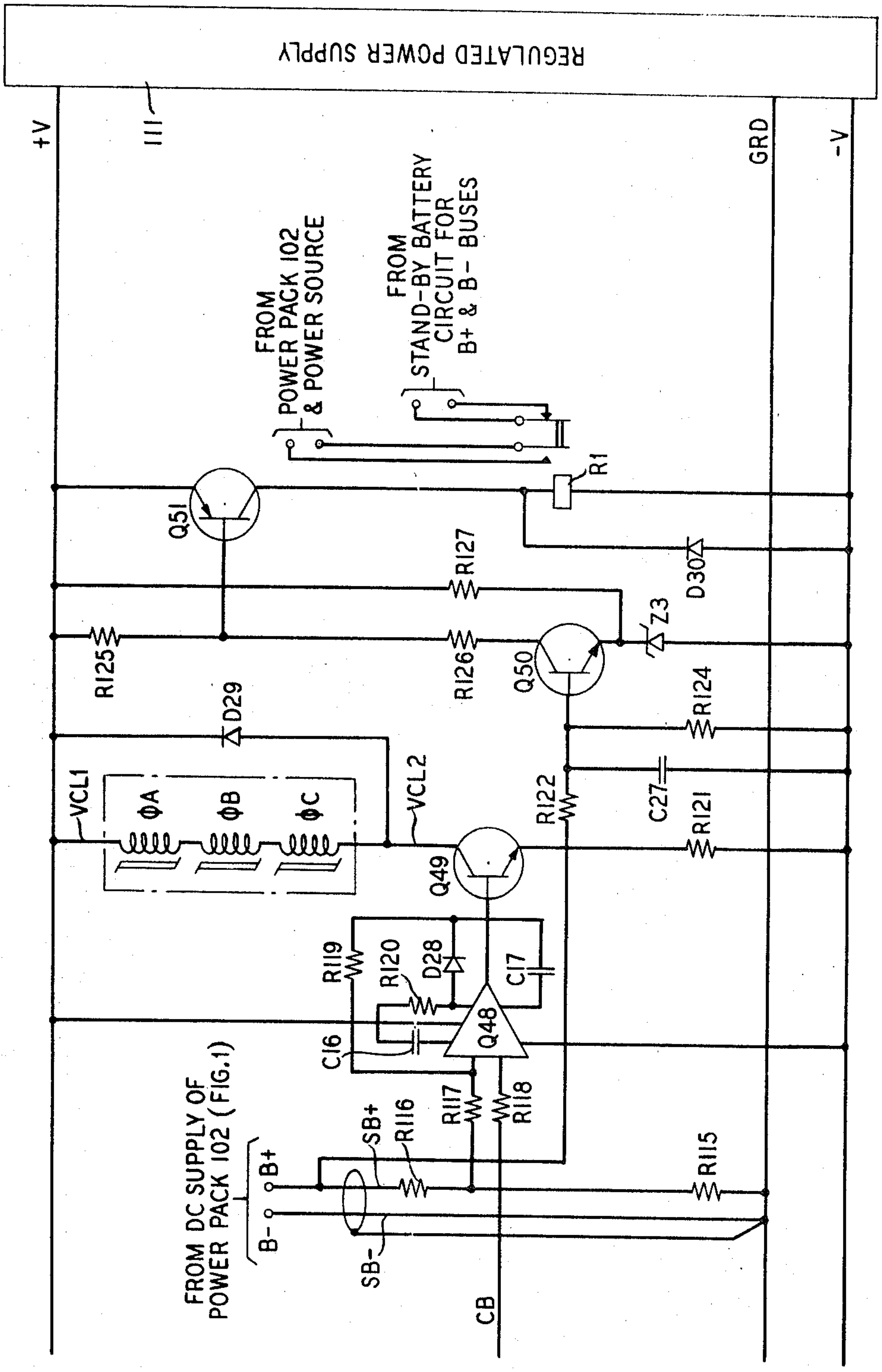

FIG. 7 shows a detailed schematic of the voltage switches and potentiometers utilized to supply the various voltage level controls to the common bus CB which extends to the input of the differential amplifier Q48 shown in FIG. 8. The stop voltage switch STP described in connection with FIG. 1 is provided by transistor Q39 in FIG. 7. Stop voltage is supplied to the common bus CB from the +V lead via resistor R97 and stop voltage potentiometer P4. Similarly transistor Q41 is the hold voltage switch HO (FIG. 1) which supplies the hold voltage to the common bus CB through the hold voltage potentiometer P3. The run voltage switch RUV is provided by transistors Q42 and Q43. These permit the run voltage to be applied to the common bus CB through the run voltage potentiometer P2. Lastly start voltage switch STV of FIG. 1 is provided by transistors Q47 and Q64 in FIG. 7 and permits the start voltage to be applied from the +V lead through start voltage potentiometer P1 to the common bus CB. The operation of these voltage switches will be described in detail hereafter when a cycle of operation of the whorl control circuit is described. For example, when transistor Q39 is conducting, the stop voltage will be shunted to ground and hence not applied to common bus CB.

The differential amplifier and current control circuit 104 described hereinbefore in connection with FIG. 1 is shown in detail in FIG. 8. The output of common bus CB is applied through resistor R118 to one input of differential amplifier Q48. The outer input of this amplifier through resistor R117 is obtained from a voltage divider comprising resistors R115 and R116 which extend via leads SB+ and SB− to the B+ and B− buses which supply the voltage from power pack 102 to the whorls 103 shown in FIG. 1. The output of differential amplifier Q48 is applied to transistor Q49. The collector of transistor Q49 is connected in series via leads VCL2 and VCL1 to saturable reactors designated $\phi$A, $\phi$B, and $\phi$C which are physically located in power pack 102 as shown in FIG. 1. Transistor Q49 via leads VCL1 and VCL2 controls the current in these saturable reactors to control the firing angle of the silicon control rectifiers in the power pack 102 and vary the output voltage applied to whorls 103. In this manner the operational amplifier Q48 senses the output voltage applied to the whorls 103 (FIG. 1) via the B+ and B− buses and in response to input from the common bus CB corrects the SCR control to provide the necessary voltage to the B+ and B− buses.

The low voltage detection circuit 112 shown in FIG. 1 is provided in FIG. 8 by transistor Q50, the base of which is connected to the SB+ lead from power pack 102. If the output voltage on the B+ bus drops below a predetermined value, transistor Q50 turns OFF, turning OFF transistors Q51. When transistor Q51 turns OFF, relay R1 is de-energized. The make contacts of relay R1 are in series with leads (not shown) connecting power pack 102 (FIG. 1) to the 120 volt A.C. source. The release of relay R1 will advantageously halt the beaming operation and through back contacts apply an emergency battery voltage to the B+ and B− buses to supply voltage to whorls 103 to provide a residual hold tension on the yarns.

A description of the operation of the whorl control circuits shown in FIGS. 4 through 8 will now be given. Assume that regulated power supply 111 shown in FIG. 8 is energized and applies a positive voltage, for example, 15 volts to the +V lead and a negative voltage of 15 volts to the −V lead with the neutral designated GRD. These leads extend throughout FIGS. 4 through 8 and provide the voltage required for operation of the transistor circuits.

Start contact STC in the upper left-hand corner of FIG. 4 corresponds to the back contact of the ST relay shown in warper drive 105 of FIG. 1. This contact STC is closed when the warper is not operating. Therefore with the warper not operating and start contact STC closed, a number of actions occur when the regulated power supply 111 is first energized.

Transistor Q37 in FIG. 6 will be turned ON from the positive voltage on lead +V through resistor R93 to the base thereof. With transistor Q37 conducting, a shunt path is provided from ramp potentiometer P5 to ground which shunts the ramp voltage OFF. Transistor Q38 shown in FIG. 7 is OFF and therefore transistor Q39 is turned ON from the positive voltage on lead +V through resistor R96. With transistor Q39 conducting the stop voltage through stop voltage potentiometer P4 is shunted OFF. Similarly transistor Q40 shown in FIG. 7 is OFF permitting transistor Q41 to turn ON from the positive voltage on lead +V through resistor R99. Transistor Q41 conducting, in turn, shunts the hold voltage from potentiometer P3 OFF. Transistors Q42 and Q43 shown in FIG. 7 are both nonconducting and accordingly no shunt path is provided from the run voltage potentiometer P2 to ground and run voltage is applied through diode D26 to common bus CB which extends the input of differential amplifier Q48 shown in FIG. 8. Run voltage is applied momentarily during the initial sequence as will be described later.

Transistor Q45 is turned ON by the voltage applied from the +V lead through the operated start contact STC over the VS lead which extends through FIGS. 5 and 6 through resistor R106 to the base of transistor Q45 in FIG. 7. With transistor Q45 conducting, transistor Q43 and transistor Q46 are held nonconducting. With transistor Q46 OFF, transistor Q47 is turned ON from the positive voltage on +V lead through resistor R111 applied to the base of transistor Q47. With transistor Q47 conducting the start voltage through start voltage potentiometer P1 is shunted OFF.

With positive voltage applied to lead VS through closed start contact STC, transistor Q9 in FIG. 4 is also turned ON. With transistor Q9 conducting, a shunt is maintained around the changing capacitor of the delay start timer switch *t1* to prevent its charging. With positive voltage applied to the VS lead capacitor C7–24 will charge through diode D8 and resistor R146. As will be described later, the discharge of this capacitor will be used to charge the time delay capacitor in delay start timer switch *t1*. One further transistor, that is transistor Q34 (FIG. 6) turns ON when potential is applied to +V and —V leads. This transistor provides a path for the discharge of capacitor C15 when the declining ramp voltages are applied as will be described later.

With the voltage supplied from the +V lead through start contact STC to the VS lead and with the jog contact JOG shown in FIG. 4 open, transistor Q1 is nonconducting, and accordingly, capacitor C1 in the delay stop timer switch *t4* initiates its timing interval. When the time out occurs and transistors Q2 and Q3 of delay stop timer switch are turned ON a positive voltage is applied from the top of resistor R10 via terminal 4 of delay start timer switch *t4* through resistor R11 to the base of transistor Q4. This positive voltage at terminal 4 of delay start timer switch *t4* is an indication that the delay stop timing interval *t4* is completed. This interval is illustrated in FIG. 2 for the *t4* interval and as indicated may be varied from .05 to 1.0 second by adjusting of the delay stop potentiometer P6.

When the delay stop timing interval *t4* is completed, positive voltage from the output terminal 4 of delay start timer switch *t4* is applied through resistor R12 as shown in FIG. 4 via the STOP lead which extends through FIGS. 5, 6 and 7 to the base of transistor Q38 and turns this transistor ON. With transistor Q38 conducting, transistor Q39 is turned OFF and the stop voltage is applied through stop voltage potentiometer P4 and diode D24 to the common bus CB. As described hereinbefore the stop voltage on common bus CB will cause differential amplifier Q48 and transistor Q49 to vary the current through the saturable reactors of power pack 102 (FIG. 1) to cause the stop voltage to be applied via +B and —B buses to whorls 103.

The positive voltage from the output of delay stop timer switch *t4* applied through resistor R11 to the base of transistor Q4 turns this transistor ON. With transistor Q4 ON, transistor Q5 is turned ON and the timing interval of the stop duration timing switch *t5* is initiated. With transistor Q4 conducting, diode D5 is forward biased and via conductor RRVS effectively places the biasing diode D15 in ramp voltage source timer switch RVSW (FIG. 5) at ground potential. This will cause the turn OFF of transistors Q19 and Q20 of this time switch in preparation for subsequent timing operation as will be described later.

With transistor Q5 conducting, positive voltage is applied via lead SDR which extends through Zener diodes Z8 and Z9 and resistor R147 shown on FIG. 6 to the base of transistor Q62 turning this transistor ON. Transistor Q62 conducting, provides a path for discharging any remaining charge on capacitor C15 through transistor Q34 ramp conductor RMB, resistor R150, and transistor Q62 to the —V lead. This will prepare capacitor C15 for subsequent charging and will ensure that it charges to the same value for each cycle of operation.

The positive voltage on lead SDR through Zener diode Z8 is also applied via lead SDRR through resistor R102 in FIG. 7 to the base of transistor Q42 turning this transistor ON. With transistor Q42 conducting the run voltage applied to common bus CB through run potentiometer P2 is shunted OFF.

As indicated previously, the turning ON of transistor Q5 in FIG. 4 initiates the stop duration timing interval *t5* shown in FIG. 2. When the stop duration timer switch *t5* times out, a positive voltage will be applied from output terminal 4 thereof through resistor R22 to the START lead which extends through FIGS. 5, 6, and 7 to the base of transistor Q64 turning this transistor ON. When transistor Q64 turns ON, the start voltage through start voltage potentiometer P1 is shunted OFF.

The positive voltage at the output terminal 4 of stop duration timer switch *t5* is also applied through resistor R23 to the HOLD lead which extends to the base of transistor Q40 in FIG. 7 turning this transistor ON. With transistor Q40 ON, transistor Q41 is turned OFF. With transistor Q41 OFF hold voltage is applied through the hold voltage potentiometer P3 and diode D25 to the common bus CB. In the same manner described above, power pack 102 (FIG. 1) is controlled to apply the hold voltage via +B and —B buses to whorls 103.

The positive voltage at terminal 4 of the stop duration timer switch *t5* is also applied to the base of transistor Q8 in FIG. 4 turning this transistor ON. When transistor Q8 turns ON, a negative going voltage signal is applied to the STOP lead which extends to the base of transistor Q38 (FIG. 7) turning this transistor OFF. Transistor Q38 in turning OFF permits transistor Q39 to turn ON from the positive voltage of +V lead through resistor R96. With transistor Q39 ON it shunts the stop voltage through stop voltage potentiometer P4 OFF. Thus at the end of *t5* stop duration timing interval, hold voltage is applied to the common bus CB and the stop voltage and start voltage are both shunted OFF. The warper is not energized and hold voltage is being applied to all of the whorls to provide a residual tension in preparation for the start of a beaming operation. FIG. 2 illustrates this condition after *t5* interval. It will be noted that the stop duration timing interval *t5* may be varied from 0.1 second to 5.0 seconds by adjusting the stop duration timing potentiometer P7.

The condition of the warper drive contacts and the voltage applied to the whorls is depicted at the left-hand side of FIG. 2. The hold voltage is being applied, the start contact is closed and the jog contact is opened. Assume now that a beaming operation is initiated. This is accomplished as indicated hereinbefore by the operation of a start switch STSW in warper drive 105 (FIG. 1) which among other things operates the warper start relay ST in the warper drive circuit 105. The operation of the warper drive start relay opens the start contact STC as shown in FIG. 4. The opening of this start contact initiates the *t1* delay start timing interval by the delay start timer switch *t1*.

The removal of the positive voltage from the VS lead by the opening of the start contact STC causes the turn OFF of transistors Q9 and Q4 in FIG. 4. The release of transistor Q9 removes the shunt from around the charging capacitor of the delay start timer switch *t1* and permits this switch to start timing its predetermined delay start interval. The timing capacitor of the timer switch *t1* charges to the voltage accumulated on capacitor C7–24 which discharges through resistor R146, delay start potentiometer P8 and through the charging capacitor to ground.

The removal of the positive voltage from the VS lead when the STC contact opens also causes the release of the delay stop timer switch *t4*. This switch releases in preparation for a subsequent delay stop operation. When transistor Q4 turns OFF with the removal of positive voltage from the VS lead, transistor Q5 is also turned OFF. When transistor Q5 turns OFF, the positive voltage applied via lead SDR and SDRR through resistor R102 to the base of transistor Q42 is removed turning transistor Q42 OFF. Transistor Q42 in turning OFF prepares the circuits for later application of run voltage to common bus CB when transistor Q43 is turned OFF. The removal of the positive voltage from lead SDR also results in the turn OFF of transistor Q62.

When the delay start timer switch *t*1 times out, a positive voltage is applied from its output terminal 4 through resistor R34, diode D9 to the base of transistor Q13. Transistor Q13 turns ON and provides a shunt path through resistor R21 and lead SDS to the input terminal 11 of stop duration time switch *t*5. This puts a shunt path around the charging capacitor of stop duration timer switch *t*5 discharging this capacitor and releasing the switch for a subsequent stop duration timing interval. When the stop duration timer switch *t*5 releases, a negative going voltage signal is applied from its output terminal 4 through resistor R23 to the HOLD lead which extends to the base of transistor Q40 (FIG. 7) turning this transistor OFF. With transistor Q40 OFF transistor Q41 is turned ON which shunts OFF the hold voltage applied through the hold voltage potentiometer P3 to the common bus CB.

In a similar manner a negative going voltage signal is applied from the output terminal 4 of stop duration timer switch *t*5 through resistor R22 to the START lead which extends to the base of transistor Q64 in FIG. 7 turning this transistor OFF. With transistor Q64 OFF the start voltage is permitted to be applied to the common bus CB through the start voltage potentiometer P1 and diode D27. As shown in FIG. 2 at the termination of the *t*1 delay start timing interval, the hold voltage is removed and the start voltage is applied to the whorls. The duration of the *t*1 delay start interval may be varied from .05 to 5.0 seconds by adjusting the delay start potentiometer P8 (FIG. 4).

The positive output voltage at terminal 4 of the delay start timer switch *t*1, when the time out is completed, is also applied through resistor R35 to the base of transistor Q12 turning this transistor ON. With transistor Q12 turned ON transistor Q14 (FIG. 5) is turned ON and initiates the timing interval of start duration timer switch *t*2. Start duration timer switch *t*2 times the interval that the start voltage is applied to whorls 103. The duration is determined by adjusting the start duration potentiometer P9 which as indicated in FIG. 2 permits varying the interval from .05 to 1.0 second.

When start duration timer switch *t*2 times out, a positive voltage at its output terminal 4 is applied through resistor R47 and diode D13 to the base of transistor Q17 which turns ON. When transistor Q17 turns ON it in turn, causes transistor Q18 to turn ON. With transistor Q18 conducting, a positive voltage is applied via lead RZV and resistor R70 to the base of transistor Q26 turning this transistor ON. With transistor Q26 conducting, transistor Q29 (FIG. 6) is turned ON which results in the turning ON of transistor Q30. With transistor Q30 conducting, a charging path for capacitor C15 is completed and this capacitor charges through diode D20, transistor Q30, resistor R81 to the +V lead.

With transistor Q18 turned ON it also applies a positive voltage signal via leads RZV, RZV1 and Zener diode Z1 (FIG. 6) through resistor R91 to the base of transistor Q32 turning this transistor ON. The signal through Zener diode Z1 is also applied to the base of transistor Q63 turning this transistor ON. With transistor Q63 ON, transistor Q62 is turned OFF which ensures that the later discharge of capacitor C15 will be directed through S5 or S6 switches to provide the ramp I and ramp II voltages as will be described.

With transistor Q18 ON the energizing of ramp voltage source timer switch RVSW (FIG. 5) is initiated. Timer switch RVSW provides a time delay which permits capacitor C15 to attain a sufficient charge to provide the ramp voltages required for the ramp I voltage and the ramp II voltage.

When the ramp voltage source timer switch RVSW times out a positive voltage from its output terminal 4 is applied through resistor R58 to the base of transistor Q25 and turns this transistor ON. With transistor Q25 conducting, transistor Q26 is turned OFF. With transistor Q26 turned OFF, transistor Q29 and Q30 are turned OFF which halts the charging of capacitor C15.

When timer switch RVSW times out the positive voltage signal from its output terminal 4 is also applied through resistor R57 to the RAMP lead which extends to the base of transistor Q36 in FIG. 6 and turns this transistor ON. With transistor Q36 conducting, transistor Q37 is turned OFF and the shunt keeping the ramp voltage at ramp voltage potentiometer P5 from the common bus CB is removed.

When ramp voltage source timer switch RSVW times out the positive voltage at its output terminal 4 is also applied through resistor R55 to the RUN lead which extends through FIG. 6 to the base of transistor Q44 in FIG. 7 turning this transistor ON. When transistor Q44 is turned ON transistor Q43 is turned OFF and the run voltage from the +V lead is applied through run voltage potentiometer P2 and diode D26 to the common output bus CB.

At this time in the starting sequence, the top of ramp I voltage shown at the end of the *t*2 start duration timing interval in FIG. 2 is applied through the ramp voltage potentiometer P5 to the common output bus CB. The magnitude of the top of the ramp voltage is adjusted by adjusting the P5 ramp voltage potentiometer (FIG. 6). At the same time a run voltage is applied through run voltage potentiometer P2 (FIG. 7) to the common output bus CB. However, since this run voltage is lower than the top of the ramp voltage as shown in FIG. 2, this has no effect upon the operation of the whorls. It does, however, provide a reference point to which the ramp voltages will decline.

With transistor Q37 in FIG. 6 OFF and transistor Q32 ON as described above, a path is completed for the application of the declining ramp I voltage to the common bus CB. This is provided by the discharge of capacitor C15 through transistor Q34, the RMB conductor, switch S5, transistor Q32 to the −V lead. The portion of the voltage on capacitor C15 which is not discharging through this path is applied to operational amplifier Q31 as described hereinbefore and provides a positive voltage via the RMP lead extending through resistor R94, ramp voltage potentiometer P5, and diode D23 to the common bus CB. The rate of decline of the ramp I voltage is determined by the rate of discharge of capacitor C15 via the discharge path through transistor Q32 and is adjusted by adjusting the tap setting of switch S5. As indicated in FIG. 2 the rate of decline of ramp I voltage may be varied from 0.25 to 2.5 volts per second.

Concurrently with the initiation of the ramp I voltage decline, the positive voltage at the output terminal of the ramp voltage source timer switch RVSW (FIG. 5) is also applied, through resistor R59 to the base of transistor Q21 turning this transistor ON. When transistor Q21 conducts, transistor Q22 is turned ON which initiates the start of the delay ramp II timing interval *t*3 by delay ramp II timer switch *t*3. Timing interval *t*3 is illustrated in FIG. 2 and is the interval of delay in the start of the ramp II declining voltage, and as indicated may be varied from 0.1 to 10.0 seconds by the adjustment of delay ramp II potentiometer P10 shown in FIG. 5.

When transistor Q21 conducts it forward biases diode D17 and via lead SDS shunts the charging capacitor of stop duration timer switch *t*5 (FIG. 4) discharging the capacitor and resetting the switch for a subsequent stop duration timing function.

When delay ramp II timer switch *t*3 times out, a positive voltage will be applied from its output terminal 4 through resistor R69 to the base of transistor Q27 turning this transistor ON. With transistor Q27 conducting transistor Q28 (FIG. 6) is turned ON. With transistor Q28 ON, transistors Q35 and Q33 are turned ON. With transistor Q33 conducting, transistor Q32 is turned OFF which halts the ramp I voltage decline through switch S5. Transistor Q35 in turning ON provides a new discharge path for capacitor C15 through transistor Q34 and switch S6. The discharge of capacitor C15 is now switched from the S5 switch through transistor Q32 to the S6 switch through transistor Q35. The S6 switch controls the slope, that is the rate of decline, of the ramp II voltage as shown in FIG. 2. This voltage will continue to decline from the point that is switched from the ramp I to the ramp II until it reaches the run level voltage as shown in FIG. 2.

The run voltage will continue to be applied via the common bus CB to the input of differential amplifier Q48 to control the voltage applied by power pack 102 via the B+ and B− leads (FIG. 1) to whorls 103. The controls will remain in this condition until the warper is stopped or until a stop signal is received. At that time the stop sequence, that is the delay stop timing interval *t4* and the stop duration timing interval *t5* shown in FIG. 2 and described hereinbefore are repeated.

When it is desired to operate the warper in the jog condition, the JOG contact and start contact STC shown in FIG. 4 will be closed. A positive voltage from the +V lead will be applied to the base of transistor Q1 turning this transistor ON. With transistor Q1 conducting delay stop timer switch *t4* is prevented from timing because of a shunt around the timing capacitor C1. A positive voltage is also applied through resistor R1 via the jog lead JOGL through diode D14 to the base of transistor Q17 (FIG. 5) causing transistor Q17 to conduct. With transistor Q17 conducting transistor Q18 is turned ON and the circuit operation described above which follows the turning ON of transistor Q18 will occur. This will result in top of ramp I voltage being applied to the common bus CB. This is illustrated in FIG. 2 when the jog contact is closed, and the usual start sequence, i.e., the delay start and application of start voltage is not followed and instead the top of the ramp I voltage is immediately applied to the whorls. When jog contact JOG is subsequently opened the delay stop timer switch *t4* and the stop duration timer switch *t5* will be operated in sequence as described hereinbefore.

It is to be understood that the above-described embodiment is illustrative of the principles of the present invention. It is to be further understood that the present invention is not limited to a beaming operation in the textile industry. The principles of the invention equally apply to any winding operation requiring controlled tension of moving filaments. Numerous other arrangements may be devised by those skilled in the art without departing from the spirit and scope of the invention.

What is claimed is:

1. A control system for controlling a plurality of electromagnetic whorl tension devices to provide controlled tension on a plurality of yarns simultaneously drawn from individual yarn packages by a warper in the production of a beam including in combination, run voltage control means for applying a run voltage to said tension devices to provide a selected run level of tension on said yarns during the operation of said warper, stop voltage control means for applying a stop voltage, greater than said run voltage to said tension devices when a stop signal is applied to said warper to halt the operation thereof to provide a controlled tension on said yarns while said warper is decelerating, and hold voltage control means for applying a hold voltage to said tension devices to provide a residual hold level of tension on said yarns while said warper is halted characterized by first control means for controlling said stop voltage control means to delay the application of said stop voltage to said tension devices for a predetermined interval after said stop signal is applied to said warper.

2. The control system defined in claim 1 further characterized by start voltage control means for applying a start voltage to said tension devices to reduce the tension said tension devices apply to said yarns and second control means for controlling said hold and, said start voltage control means to remove said hold voltage from and apply said start voltage to said tension devices a predetermined time interval after a start signal is applied to said warper to initiate the operation thereof.

3. The control system defined in claim 2 further characterized by ramp voltage control means for applying a ramp level voltage, greater than said run voltage to said tension devices to provide a control tension on said yarns and third control means for controlling said ramp voltage control means to apply said ramp level voltage to said tension devices a predetermined interval after said start voltage is applied thereto.

4. The control system defined in claim 3 further characterized by a first ramp control means for controlling said ramp voltage control means to reduce the voltage applied to said tension devices from said ramp level toward said run voltage at a first predetermined rate, a second ramp control means for controlling said ramp voltage control means to reduce the voltage applied to said tension devices toward said run voltage at a second predetermined rate, and fourth control means for transferring control of said ramp voltage control means from said first ramp control means to said second ramp control means a predetermined interval after operation of said first ramp control means.

5. The control system defined in claim 4 further characterized by monitoring means for monitoring the voltage applied to said tension devices, said monitoring means operable when said voltage falls below a predetermined value, and means controlled by said monitoring means for halting the operation of said warper.

6. In a control system for controlling a plurality of electromagnetic whorl tension devices to provide controlled tension on a plurality of yarns simultaneously drawn from individual yarn packages by a winding machine during a winding operation, the combination comprising run voltage control means for applying a run voltage to said tension device to provide a selected run level of tension on said yarns during the operation of said machine, hold voltage control means for applying a hold voltage to said tension devices to provide a residual hold level of tension on said yarns while said machine is halted, start voltage control means for applying a start voltage to said tension devices to reduce the tension said tension devices apply to said yarn, and means for controlling said hold and said start voltage control means to remove said hold voltage from and apply said start voltage to said tension devices a predetermined interval after a start signal is applied to said machine to initiate said winding operation.

7. The combination defined in claim 6 further comprising ramp voltage control means for applying a ramp level voltage greater than said run voltage to said tension device, and means for controlling said run voltage control means and said ramp voltage control means to apply said run voltage and said ramp level voltage to said tension device a predetermined interval after said start voltage is applied thereto.

8. The combination defined in claim 7 further comprising means for controlling said ramp voltage control means to reduce the voltage applied to said tension device from said ramp level voltage toward said run voltage level at a predetermined rate.

9. The combination defined in claim 8 further comprising means operable a predetermined interval after said ramp level voltage is applied to said tension device for changing the predetermined rate of reduction of said voltage applied to said tension devices.

10. The combination defined in claim 9 further comprising means for monitoring the voltage applied to said tension devices, and means controlled by said monitoring means and operable when said voltage falls below a preselected value for halting said winding operation.

11. In a control system for controlling a plurality of electromagnetic whorl tension devices to provide controlled tension on a plurality of yarns simultaneously drawn from individual yarn packages by a winding machine during a winding operation, the combination comprising run voltage control means for applying a run voltage to said tension devices to provide a selected run level of tension on said yarns during the operation of said machine, ramp voltage control means for applying a ramp level voltage, greater than said run voltage to said tension devices, means for controlling said ramp voltage control means to apply said ramp level voltage to said tension devices to correspond to the time of movement of said winding machine when a winding operation is initiated, and ramp means for reducing the voltage applied to said tension device at a predetermined rate from said ramp level voltage toward said run voltage.

12. The combination defined in claim 9 further comprising means operable a predetermined interval after said ramp level voltage is applied to said tension devices for controlling said ramp means to change the rate of reduction of voltage applied to said tension devices.

References Cited

UNITED STATES PATENTS

| | | | |
|---|---|---|---|
| 1,940,477 | 12/1933 | Abbott | 28—35 |
| 2,688,789 | 9/1954 | Duryee | 28—51 |
| 2,907,535 | 10/1959 | Mindheim et al. | 242—150 |
| 3,072,361 | 1/1963 | Fuller | 242—155M |

OTHER REFERENCES

"Electromagnetic Whorl Tension," by G. W. Heard; Modern Textiles, July 1970, pp. 24 to 28.

LOUIS K. RIMRODT, Primary Examiner

U.S. Cl. X.R.

28—35, 51